United States Patent [19]
Virgil

[11] 3,935,901
[45] Feb. 3, 1976

[54] DIESEL FUEL LINE HEATER
[76] Inventor: Eldon E. Virgil, 2150 S. Galapago St., Denver, Colo. 80223
[22] Filed: June 3, 1974
[21] Appl. No.: 475,819

[52] U.S. Cl. ............... 165/52; 123/122 E; 165/168
[51] Int. Cl.² .............................................. F02N 31/08
[58] Field of Search .................. 165/52, 47, 168; 123/122 E, 133

[56] References Cited
UNITED STATES PATENTS

| | | | |
|---|---|---|---|
| 1,168,111 | 1/1916 | Pope | 123/122 E |
| 1,332,327 | 3/1920 | Eastwood | 165/52 |
| 1,889,270 | 11/1932 | Thomas | 123/122 H |
| 2,077,764 | 4/1937 | Liles | 123/122 H |

*Primary Examiner*—Charles J. Myhre
*Assistant Examiner*—R. H. Lazarus
*Attorney, Agent, or Firm*—Richard D. Law

[57] ABSTRACT

An arcuate chamber, fitted against a portion of a replaceable fuel line filter for a diesel engine includes an inner high heat transfer material adjacent the filter element, inlet and outlet lines for the chamber for passing engine exhaust gases, an exhaust flow control valve, and a releasable fastener securing the chamber to a filter element.

3 Claims, 4 Drawing Figures

DIESEL FUEL LINE HEATER

BACKGROUND OF THE INVENTION

Cold weather prevents, or at least severely curtails, operation of outdoor equipment using diesel engines as the motivating power. As the ambient temperature drops below freezing, the diesel fuel thickens or jells, preventing a free flow of the fuel through the fuel system lines and prevents efficient operation of the engine. Most diesel fuel pumps are generally sufficiently powerful to pump the fuel even with extreme gelation, however, the fuel filter tends to retard and/or stop the flow, and the fuel jets of the engine tend to wear rapidly or plug under such extreme conditions. Gelation of the diesel fuel prevents the efficient flow of fuel through the injection jets of the cylinders and prevents optimum operation of the diesel engine.

Many attempts have been tried to solve the problem, but numerous factors have weighed against success of these previous attempts. Many such attempts involve changing the fuel system itself, adding units to the system which change fuel flow characteristics or introducing external agencies, such as electric heaters, for heating the incoming combustion air or the diesel fuel. Some attempts have been made to heat the fuel tank, while some have attempted to heat the fuel by insertion of heaters in the fuel line requiring a reconstruction of the fuel line. For example, in U.S. Pat. No. 3,209,816, issued Oct. 15, 1965, the existing fuel line of an engine is cut and a heater-separator is inserted into the fuel line. This requires cutting into the existing fuel lines, reconstructing the fuel system to accommodate an added heater-separator, and rearranging the system to include the added device under the hood for the engine. In U.S. Pat. No. 3,626,917, the fuel system is reconstructed to insert a self-contained heater which includes a combustion chamber separate from the engine and utilizing fuel from the diesel fuel tank to heat air for combustion in the engine. This system is primarily for starting the engine and has no effective utility for the engine after starting. U.S. Pat. No. 3,699,938 shows a way to replumb the fuel lines of a diesel engine which includes an engine coolant liquid heater for incoming fuel to the engine. This system, of course, requires that the engine be started and all the engine coolant heated before the air heater is effective in heating the incoming fuel. U.S. Pat. No. 3,630,183 includes an elaborate air pre-heater for a diesel engine using a separate fuel burner to heat the incoming air for the diesel fuel for the engine.

Thus, the prior art shows numerous attempts to aid cold weather operation, but these have only been partially successful at best. Many such systems introduce another element of risk into the operation of the diesel, i.e., separate burners, which only provides for heating air for the combustion of the engine.

SUMMARY OF THE INVENTION

The device of the present invention provides heat for the fuel filter of a diesel engine fuel line, which eliminates gelation of the diesel fuel going out of the fuel filter to the engine. This decreases the work from the fuel pump by eliminating gelation in probably the most constricted portion of the fuel line, i.e., the filter element, This, also, decreases wear and plugging of the jet orifices of the fuel injection system. A plenum chamber externally fastened to the filter element of the fuel filter uses hot exhaust gas to heat the filter. As soon as an engine is started, the exhaust gas is, of course, hot, and this hot gas is almost immediately used to heat the filter element. Thus the heat is applied to the fuel at the slowest flow volume in the fuel line (in the fuel filter element) and thus uses rapid heating of the fuel by the first hot exhaust gases coming from the engine and continue to heat the fuel filter element during engine operation. The fuel flow to the engine is accurately controlled and plugging of the filter and the fuel jets is eliminated, thus maintaining the efficiency of the engine during cold weather operation.

It is, therefore, an object and advantage of the invention to provide a diesel fuel heater for diesel fuel flowing to an engine. Another object of the invention is to provide a diesel fuel heater for a diesel fuel filter without change of the fuel line system.

Another object of the invention is to provide a diesel fuel heater for a diesel fuel filter which includes a simple and easy to install and remove heater for the fuel filter.

Still another object of the invention is to provide a diesel fuel heater for a diesel fuel filter which includes a plenum chamber easily and quickly attached to a diesel engine fuel filter for cold weather operation of the engine.

An additional object of the invention is to provide a diesel fuel heater for a diesel fuel line filter which is easily and accurately controlled in the amount of heating of the filter element and may be easily shut off to prevent further heating of the fuel filter for warmer temperature operation.

SPECIFIC DESCRIPTION OF THE INVENTION

The above objects and advantages may be best and more fully understood by referring to the following description and appended illustrations in which.

Figure 1:
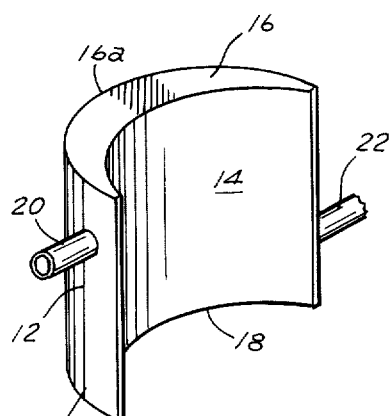
FIG. 1 is a perspective view of a diesel fuel line filter heater according to the invention.
Figure 4:
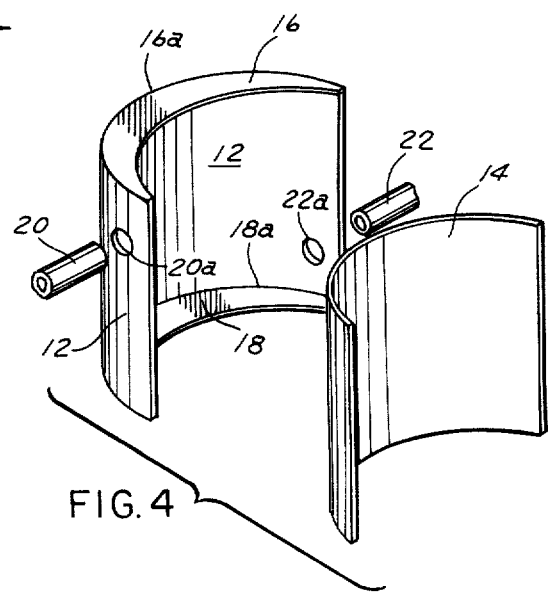
FIG. 4 is an exploded view of the components of the filter of the invention.

In the device illustrated in the drawings, a plenum chamber is provided for temporary attachment to a fuel filter for a diesel engine and it includes an arcuate chamber 10, shown in FIG. 1, which includes an arcuate outer wall 12, an arcuate inner wall 14, and end walls 16 and 18. An exhaust inlet 20 is provided in the upper portion of one side of the chamber and an exhaust outlet 22 is provided in a lower portion of the opposite side of the chamber. As shown in FIG. 4, the sheet forming wall 12 is formed in an arcuate configuration having a slightly less radius of curvature than the inner wall 14 so as to provide, when fitted against the inner wall 14, a chamber therebetween. End walls 16 and 18 are welded to the rear wall 12, and the arcuate inner wall is, likewise, welded or brazed to the inner edges of the U-shaped combined end walls and rear wall 12. An exhaust inlet 20 is welded into an opening 20a in the upper portion of one side of the chamber, and an exhaust outlet 22 is welded into the opening 22a on the opposite side of the rear wall but at a lower position. The back wall is preferably made of sheet steel, cut to size and rolled into an arcuate configuration. The end walls 16 and 18, made of the same material, may be cut to size as quarter moons and then welded along weldments 16a and 18a respectively to the wall 12. The inlet nipple 20 and the outlet nipple 22 for the exhaust gas may be made of the same material as the wall and ends, or they may be made of copper or the like, as desired. The inner wall 14 has an arcuate configuration arranged to fit over the opening of the cupped wall and the end pieces, and is preferably formed of copper so as to provide a high-heat transfer material which will be adjacent the filter element of the fuel system of the diesel engine. This arcuate sheet is then brazed in the opening providing a closed plenum chamber with an inlet and outlet for the diesel exhaust gases. Any other high heat transfer material may be used for the inner wall 14, so long as it is durable to the hot exhaust gases.

Figure 3:
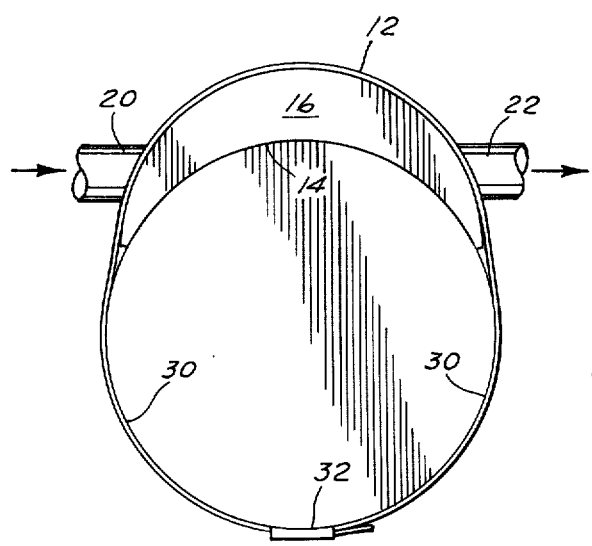
FIG. 3 is a top plan view of the heater of the invention for attachment to a filter element.

As shown in FIG. 3, the plenum chamber may be provided with a band or strap 30 having a take-up connector 32 for fastening the chamber to a filter element. The band 30 may be secured to the plenum chamber or may merely pass around the chamber for securing the same to a filter element. The plenum chamber should be closely adjacent to the filter element, and preferably with the inner wall conforming to the exterior of the filter element, and contacting the same.

Figure 2:
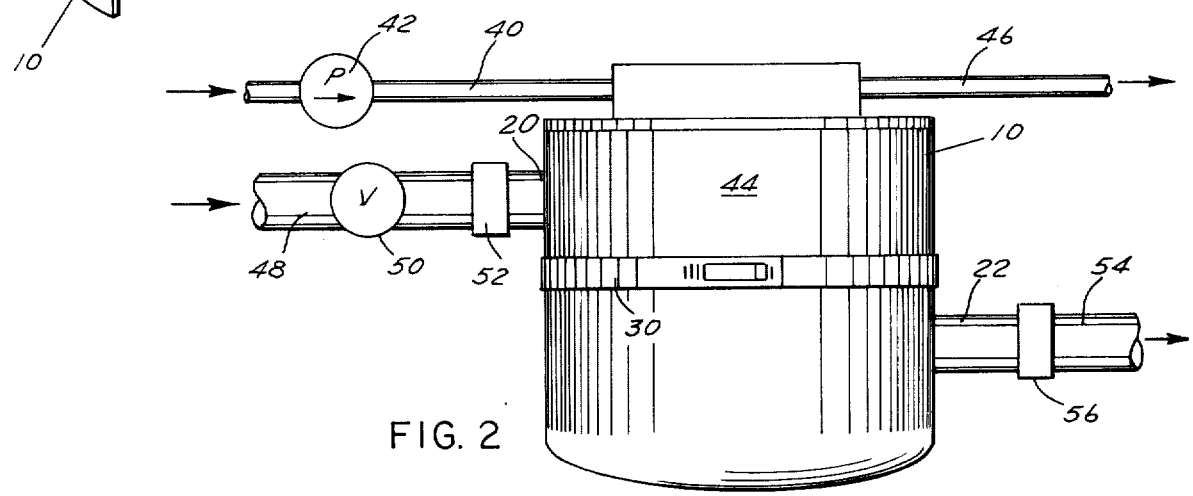
FIG. 2 is a side elevational view of a filter element heater according to the invention showing a schematic hook-up of the heater onto an existing diesel fuel line.

As shown in FIG. 2, a fuel line 40, provided with a fuel pump 42, is arranged to pass fuel through the filter element of a filter 44 to a line 46 which is directed to the injection system of a diesel engine. Such filters having removable filter elements for a fuel line is a common matter for both diesel fuels and gasoline fuels. Normally, such fuel filters include a replaceable element which is threaded into the filter head fitting which joins the two ends of the fuel line. The heater 10 is secured to the filter element of the filter 44 by means of the strap 30, and is held closely adjacent or contacting the filter element. Exhaust gas enters the heater from an exhaust line 48, which may be attached to the exhaust manifold of the engine, through a control valve 50 to the nipple 20 of the heating chamber 10. The line 48 may be a copper line, or the like, from the exhaust manifold and it is connected by means of a sleeve connector 52 to the nipple 20. The exhaust gas passes through the plenum chamber out the outlet nipple 22 to an outline line 54 which is connected by a slip connector 56 to the nipple 22. The valve 50 provides means for controlling the flow of the exhaust gases through the chamber and thereby control the heating of the fuel in the fuel element of the filter.

With the plenum chamber secured to the filter element, the engine, to which it is attached, is started and the valve 50 is turned to wide open so that the first hot gases from the engine pass through the plenum chamber. The high heat transfer wall passes the heat to the filter element heating the same and heating the fuel that is in the element. The exhaust gases pass out through the nipple 22 into the line 54. The line 54 may be passed back into the diesel exhaust stack or it may be exhausted to the atmosphere. As soon as the hot exhaust gases reach the chamber 10, the filter element is started to heat and any gelation of the fuel therein is eliminated and free flowing fuel is passed through the line 45. The heater may be used as long as the weather is cold; however, as soon as the weather starts to warm up so that gelation is no longer a problem, the heater is easily stopped by merely turning the valve 50. For summer operation the heater may be easily and quickly removed by removing the slip connectors 52 and 56 and the heater may be stored for the summer. It is then, of course, easily secured back onto the filter element by replacing it into the exhaust lines. Furthermore, it is noted that there is no change in the fuel system and since there is no additional elements placed in the fuel system the pressure drop and fuel flow through the fuel system will remain the same.

I claim:

1. A heater to be mounted against a cylindrical side of a filter of a diesel fuel line comprising:
    a. a metal arcuate backing member porportioned to extend around less than one-half of the circumference of the filter for a diesel fuel line and including quarter moon-shaped end closure members secured to the top and bottom ends of said arcuate backing member and forming therewith an inner, arcuate open side which is proportioned to lie against the cylindrical side of the filter.
    b. a high heat transfer, arcuate metal sheet covering said inner open side, sealed to said end closure members and to the edges of said backing member forming a plenum chamber therewith, and having its inner surface approximately the same arcuate configuration as the filter so that said chamber fits closely to about one-half of the filter circumference and said backing member having a lesser radius of curvature to provide said plenum chamber with a thicker portion in the middle than at the ends;
    c. an exhaust inlet means mounted in said backing member adjacent one edge and one end thereof, and an exhaust outlet mounted in said backing member adjacent the opposed edge and the opposite end thereof; and
    d. means for securing said chamber to a filter member in a diesel fuel line.

2. A heater according to claim 1 wherein said means for securing said chamber is strap means.

3. A heater according to claim 1 wherein valve means is provided in one of said exhaust inlet and outlet means.

* * * * *